June 12, 1928.  
D. W. McGEE  
MEASURING RULE  
Filed June 29, 1926
1,673,577
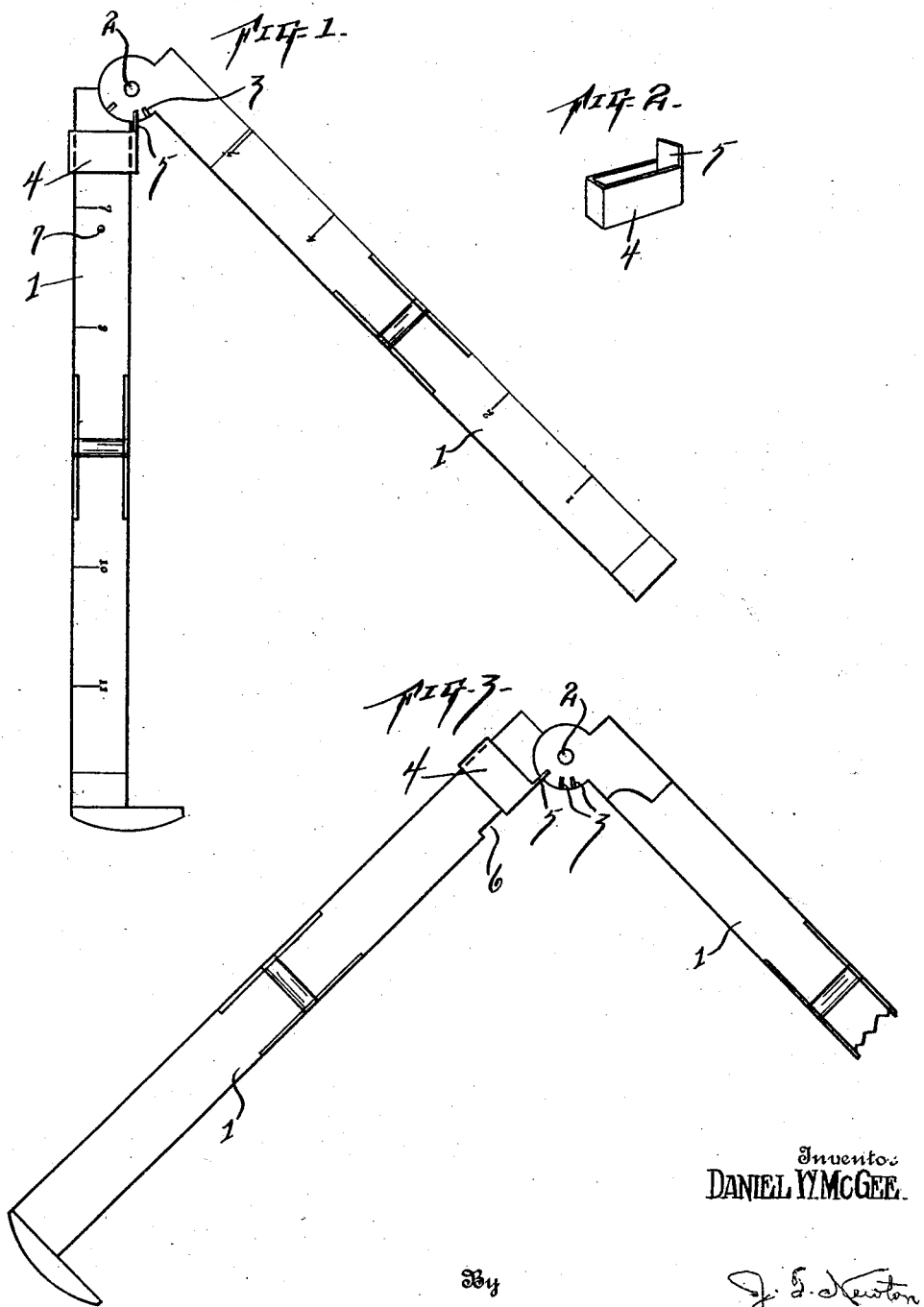
Inventor  
DANIEL W. McGEE  
By  
J. H. Newton  
Attorney Patented June 12, 1928.

1,673,577

UNITED STATES PATENT OFFICE.

DANIEL W. McGEE, OF FORT WORTH, TEXAS, ASSIGNOR TO GARRETT SMITH, OF FORT WORTH, TEXAS.

MEASURING RULE.

Application filed June 29, 1926. Serial No. 119,462.

My invention relates to attachments and devices to operate in conjunction with measuring rules; and the objects of my improvement and invention are—

First, to provide an inexpensive and convenient attachment and device which will allow the rule to be converted through the use of said attachment and device into an instrument to designate certain angles upon a surface, particularly a plane surface; and, Second, to provide an attachment and device by which a folding measuring rule may be easily and quickly converted into an instrument for determining the location of certain lines and angles upon surfaces; and, Third, to eliminate the requirement of additional tools and instruments such as squares, mitres, tri-squares, et cetera, by means of the attachments and devices, when applied to or used in conjunction with a folding measuring rule, because through such attachment and device, it is made to serve the purpose of other tools and instruments.

I attain these objects by the arrangements, attachments and devices illustrated in the accompanying drawing, in which Figure 1 is a side view of a folding rule illustrating the device; Figure 2, a view of a part of the attachment and device; and, Figure 3, a side view of another folding rule fixed and adjusted at a different angle from Figure 1.

Similar numerals refer to similar parts throughout the several views.

In all of the drawings 1 represents the measuring sections of a folding rule; 2 represents a hinge, connecting said sections, consisting of plates pivoted together at their abutting ends and respectively attached to the measuring sections at their free ends; 3 represents spaced notches in the periphery of one of the aforesaid hinged plates; 4 represents a box-like slide fitting snugly around the other plate and attached measuring section and movable thereon, said slide having one of its ends continued so as to form a projecting finger 5. Referring to Fig. 1, 7 denotes a small protruding pin on the face of the measuring section to act as a stop for the slide. Referring to Fig. 3; 6 denotes an indentation on the edge of the rule; which allows the rule to close tightly and also limits the path of travel of the box-like slide.

By moving the box-like slide 4, which fits snugly around the faces of the rule, toward the hinge 2, a rigid and stationary device is formed, the projecting finger 5 of the slide engaging the notches 3; as illustrated in Figures 1 and 3. When it is desired to change the angular relation between the hinged sections of the rule, the slide 4 is pushed in the opposite direction until the finger 5 becomes disengaged from the notches 3.

Various changes in the size and shape as well as modifications may be made without departing from the spirit of the invention and within the scope of the appended claim.

I claim:

A rule comprising hinged measuring sections, one of which has its hinged portion circular in outline and projecting laterally of its edge, and a cut away portion in the other section fitting around said circular portion, said cut away portion also having extending therefrom a slot in the face of said measuring section, said circular portion having notches in its periphery spaced apart, and a box-like slide fitting in said slot in the other section and slidable on said section, said slide having one of the side walls projecting to form a finger to engage in the notches of said circular part for holding the measuring sections in predetermined angular relation, the slot in the face providing space for said slide and allowing the inner faces of the two sections to coincide with each other throughout when the sections are in closed relation.

DANIEL W. McGEE.